United States Patent
Grabon

(10) Patent No.: US 11,655,804 B2
(45) Date of Patent: May 23, 2023

(54) THERMALLY DRIVEN ELASTOCALORIC SYSTEM

(71) Applicant: Carrier Corporation, Palm Beach Gardens, FL (US)

(72) Inventor: Michel Grabon, Bressolles (FR)

(73) Assignee: Carrier Corporation, Palm Beach Gardens, FL (US)

( * ) Notice: Subject to any disclaimer, the term of this patent is extended or adjusted under 35 U.S.C. 154(b) by 0 days.

(21) Appl. No.: 17/301,571

(22) Filed: Apr. 8, 2021

(65) Prior Publication Data

US 2021/0324839 A1    Oct. 21, 2021

Related U.S. Application Data

(60) Provisional application No. 63/010,823, filed on Apr. 16, 2020.

(51) Int. Cl.
*F03G 7/06*    (2006.01)

(52) U.S. Cl.
CPC .......... *F03G 7/065* (2013.01); *F05C 2251/08* (2013.01)

(58) Field of Classification Search
CPC .............................. F03G 7/065; F05C 2251/08
USPC .................................................. 60/526–528
See application file for complete search history.

(56) References Cited

U.S. PATENT DOCUMENTS

| | | | | |
|---|---|---|---|---|
| 5,821,664 | A | * | 10/1998 | Shahinpoor ............. F03G 7/065 310/307 |
| 8,172,458 | B2 | * | 5/2012 | Petrakis ................. G01K 5/483 374/187 |
| 8,631,652 | B2 | | 1/2014 | Alexander et al. |
| 9,612,040 | B2 | | 4/2017 | Casset |
| 10,107,529 | B2 | | 10/2018 | Ikegami et al. |
| 10,119,059 | B2 | | 11/2018 | Cui et al. |
| 10,323,865 | B2 | | 6/2019 | Cui et al. |
| 10,563,640 | B2 | | 2/2020 | Cullen et al. |

(Continued)

FOREIGN PATENT DOCUMENTS

| | | |
|---|---|---|
| CN | 106052190 A | 10/2016 |
| DE | 102015121657 A1 | 6/2017 |

(Continued)

OTHER PUBLICATIONS

EP Application 21164985.0, Extended Search Report, dated Aug. 16, 2021, 8 pages.

*Primary Examiner* — Shafiq Mian
(74) *Attorney, Agent, or Firm* — Patricia Whitehouse

(57) ABSTRACT

A thermally driven elastocaloric system and a method for generating at least one of a heating potential and a cooling potential are provided. The thermally driven elastocaloric system includes a first shape memory alloy (SMA) member, a second shape memory alloy (SMA) member, and a connection mechanism configured between the distal end of the first SMA member and the distal end of the second SMA member. The connection mechanism is configured to transfer a force between the first SMA member and the second SMA member. The transfer of a compressive force to an SMA member may generate a heating potential in the SMA member, and the transfer of a tensile force to an SMA member may generate a cooling potential in the SMA member. Whether a compressive force or a tensile force is transferred may be dependent on whether heat is transferred to or from a SMA member.

20 Claims, 6 Drawing Sheets

(56) References Cited

U.S. PATENT DOCUMENTS

| | | | | |
|---|---|---|---|---|
| 2003/0128491 A1* | 7/2003 | Bueno Ruiz | ............ | B64G 1/641 |
| | | | | 361/115 |
| 2005/0105587 A1* | 5/2005 | Shahinpoor | ............ | G01K 5/483 |
| | | | | 374/E5.031 |
| 2010/0208768 A1* | 8/2010 | Lakner | ................... | H01H 37/54 |
| | | | | 374/E5.03 |
| 2019/0264958 A1 | 8/2019 | Zerovnik | | |
| 2020/0049389 A1 | 2/2020 | Wuest | | |
| 2020/0088449 A1 | 3/2020 | Sharar et al. | | |
| 2020/0370796 A1* | 11/2020 | Langan | ................... | F03G 7/065 |

FOREIGN PATENT DOCUMENTS

| | | | | |
|---|---|---|---|---|
| DE | 102016100596 A1 | 6/2017 | | |
| EP | 3306082 A2 | 4/2018 | | |
| GB | 2533357 A | 6/2016 | | |
| JP | 2015068619 A2 | 4/2015 | | |
| WO | 2019137685 A1 | 7/2019 | | |
| WO | 2019137691 A1 | 7/2019 | | |
| WO | 2019141517 A1 | 7/2019 | | |
| WO | 2019149783 A1 | 8/2019 | | |
| WO | WO-2019149783 A1 * | 8/2019 | ............. | F25B 23/00 |
| WO | 2019166251 A1 | 9/2019 | | |
| WO | 2019219276 A1 | 11/2019 | | |
| WO | 2020030482 A1 | 2/2020 | | |

\* cited by examiner

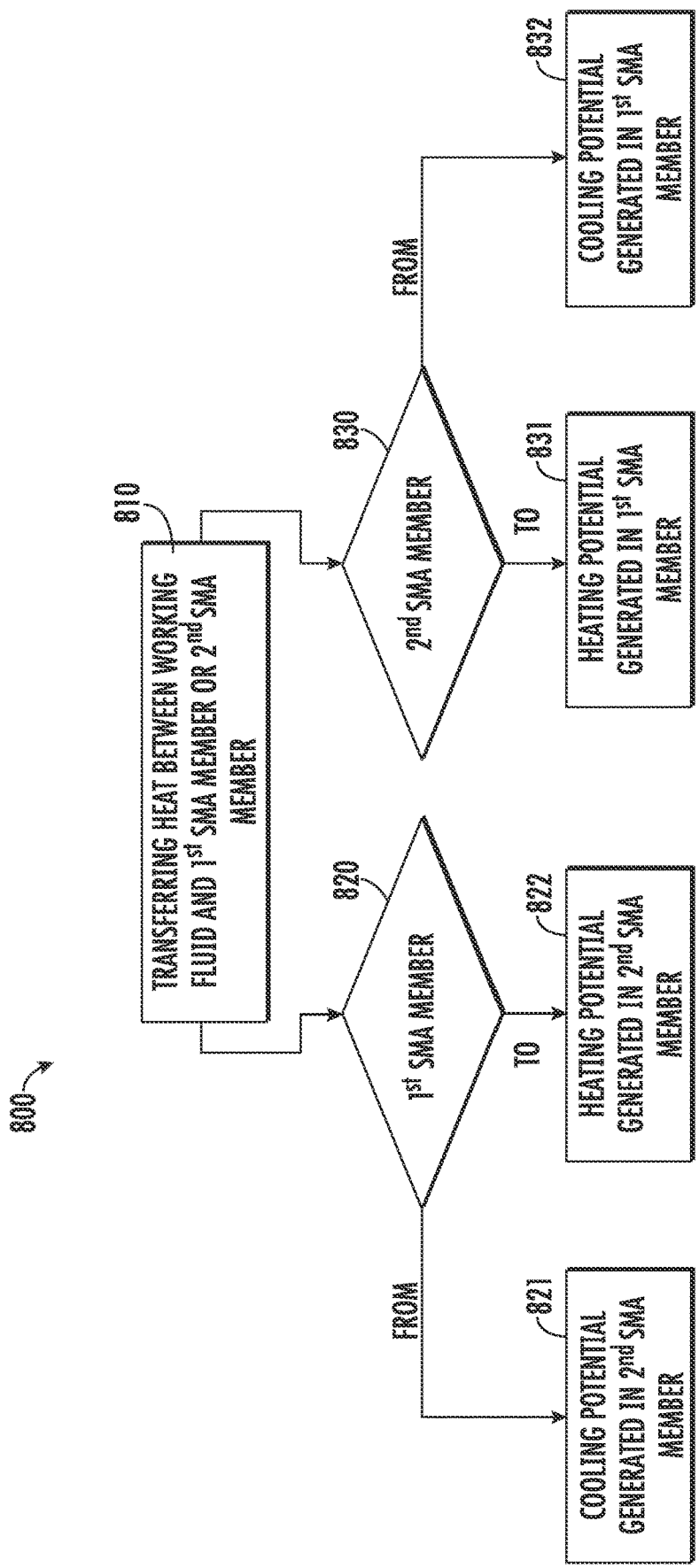

THERMALLY DRIVEN ELASTOCALORIC SYSTEM

CROSS REFERENCE TO A RELATED APPLICATION

The application claims the benefit of U.S. Provisional Application No. 63/010,823 filed Apr. 16, 2020, the contents of which are hereby incorporated in their entirety.

BACKGROUND

Elastocaloric cooling or heating is a solid-state based technology, which utilizes materials known as shape memory alloys. A shape memory alloy (SMA) is a material that can change crystallographic structure (e.g., in a reversible manner between martensite and austenite) when force is applied to the SMA or when heat in transferred to or from the SMA. When changing structure, the SMA changes shape (e.g., increases or decreases in length) and generates a thermal potential (e.g., either a cooling potential or a heating potential). For example, when changing structure the SMAs can either absorb heat (e.g., creating a cooling potential) or release heat (e.g., creating a heating potential). Due to these properties, SMAs present a wide array of potential applications in a vast number of different technologies.

One potential application of SMAs that has already been explored is the use of an SMA to drive a piston (e.g., for a pump). When used to drive a piston, one end of the SMA may be attached to the piston so that when the shape (e.g., the length) of the SMA changes the piston is driven (e.g., up or down). To cause the SMA to change shape (e.g., to drive the piston), the SMA typically is heated or cooled using a fluid medium. The piston translates this force into useful mechanical work (e.g., for a hydraulic system). As described above, this application of SMA technology may be viewed as the application of a thermal energy to generate a force.

Another potential application of SMAs that has already been explored is the use of a SMA to generate a thermal potential (e.g., a cooling potential or a heating potential) by mechanically driving the SMA (e.g., using an actuator). This thermal potential may be particularly useful in heating ventilation and/or air conditioning (HVAC) systems. For example, the thermal potential may be useful to either heat or cool the fluid (e.g., air or liquid) in the HVAC system, or replace the refrigerant altogether. To generate the thermal potential, the SMA typically is mechanically driven by consuming an electrical power or a combustible fuel. When placed in tension, the SMA absorbs thermal energy and generates a cooling potential (e.g., as an endothermic reaction). Conversely, when placed in compression, the SMA generates a heating potential (e.g., as an exothermic reaction). As described above, this application of SMA technology may be viewed as the application of a force (e.g., generated by an electrical power or combustible fuel) to generate a thermal potential.

Both the applications mentioned above include the use of an SMA alongside a mechanical component (e.g., a piston and/or an actuator) to either generate a force (e.g., by heating or cooling an SMA to move a piston) or generate a thermal potential (e.g., by placing an SMA under tension using an actuator). However, neither of these applications describe transferring a thermal energy to/from one SMA to generate a thermal potential in another SMA. By using thermal energy as a driving force, the reliance on electrical power and/or combustible fuel to generate a thermal potential may be eliminated.

Accordingly, there remains a need for a thermally driven elastocaloric system that is capable of transferring a thermal energy to/from one SMA to generate a thermal potential in another SMA.

BRIEF DESCRIPTION

According to one embodiment, a thermally driven elastocaloric system including a first shape memory alloy (SMA) member, a second shape memory alloy (SMA) member, and a connection mechanism is provided. The first shape memory alloy (SMA) member includes a proximal end and a distal end. The second shape memory alloy (SMA) member includes a proximal end and a distal end. The connection mechanism is configured between the distal end of the first SMA member and the distal end of the second SMA member. The connection mechanism is configured to transfer a force between the first SMA member and the second SMA member.

In accordance with additional or alternative embodiments, the thermally driven elastocaloric system further includes a working fluid for transferring a heat between the working fluid and at least one of the first SMA member and the second SMA member.

In accordance with additional or alternative embodiments, the working fluid is configured to transfer heat to the first SMA member.

In accordance with additional or alternative embodiments, the connection mechanism transfers a compressive force to the second SMA member when heat is transferred from the working fluid to the first SMA member.

In accordance with additional or alternative embodiments, the compressive force transferred by the connection mechanism to the second SMA member generates a heating potential in the second SMA member.

In accordance with additional or alternative embodiments, the working fluid is configured to transfer heat to the second SMA member.

In accordance with additional or alternative embodiments, the connection mechanism transfers a compressive force to the first SMA member when heat is transferred from the working fluid to the second SMA member.

In accordance with additional or alternative embodiments, the compressive force transferred by the connection mechanism to the first SMA member generates a heating potential in the first SMA member.

In accordance with additional or alternative embodiments, the working fluid is configured to transfer heat from the first SMA member.

In accordance with additional or alternative embodiments, the connection mechanism transfers a tensile force to the second SMA member when heat is transferred from the first SMA member to the working fluid.

In accordance with additional or alternative embodiments, the tensile force transferred by the connection mechanism to the second SMA member generates a cooling potential in the second SMA member.

In accordance with additional or alternative embodiments, the working fluid is configured to transfer heat from the second SMA member.

In accordance with additional or alternative embodiments, the connection mechanism transfers a tensile force to the first SMA member when heat is transferred from the second SMA member to the working fluid.

In accordance with additional or alternative embodiments, the tensile force transferred by the connection mechanism to the first SMA member generates a cooling potential in the first SMA member.

According to another aspect of the disclosure, a method for generating at least one of a heating potential and a cooling potential is provided. The method includes a step for transferring a heat between a working fluid and at least one of a first SMA member and a second SMA member, a connection mechanism configured between the first SMA member and the second SMA member. The method also includes a step for transferring a force between the connection mechanism and at least one of the first SMA member and the second SMA member, the force including at least one of: a compressive force and a tensile force.

In accordance with additional or alternative embodiments, the transfer of the compressive force generates a heating potential and the transfer of a tensile force generates a cooling potential.

In accordance with additional or alternative embodiments, the transfer of heat from the working fluid to the first SMA member generates the transfer of compressive force from the connection mechanism to the second SMA member.

In accordance with additional or alternative embodiments, the compressive force transferred by the connection mechanism to the second SMA member generates a heating potential in the second SMA member.

In accordance with additional or alternative embodiments, the transfer of heat from the first SMA member to the working fluid generates the transfer of tensile force from the connection mechanism to the second SMA member.

In accordance with additional or alternative embodiments, the tensile force transferred by the connection mechanism to the second SMA member generates a cooling potential in the second SMA member.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way. With reference to the accompanying drawings, like elements are numbered alike:

FIG. 6 is a flow diagram illustrating a method for generating at least one of a heating potential and a cooling potential in accordance with one aspect of the disclosure.

DETAILED DESCRIPTION

A thermally driven elastocaloric system and a method for generating at least one of a heating potential and a cooing potential are provided. The thermally driven elastocaloric system and the method both incorporate the transfer of a thermal energy to/from one shape memory alloy (SMA) member to generate mechanical force, which is applied to another shape memory alloy (SMA) member (e.g., using a connection mechanism) to cause the SMA member to either absorb or release thermal energy. Accordingly, the thermally driven elastocaloric system incorporates two separate SMA members (e.g., described herein as the first SMA member and the second SMA member). Both the first SMA member and the second SMA members respectfully include a proximal end and a distal end. A connection mechanism is configured between the distal end of the first SMA member and the distal end of the second SMA member. The connection mechanism is configured to transfer a force (e.g., either a compressive force or a tensile force) between the first SMA member and the second SMA member. The transfer of a compressive force to an SMA member generates a heating potential in the SMA member and the transfer of a tensile force to an SMA member generates a cooling potential in the SMA member. It is envisioned that the system and method described herein may be useful in any application, which has a waste heat source and/or relies on thermodynamic principles (e.g., heating, ventilation and/or air conditioning (HVAC) systems or refrigeration systems). It should be appreciated that the thermal potential generated in the second SMA member may vary based on the composition of each SMA member, as different SMA materials may have different transition temperatures and/or phase change temperatures.

Figure 1:
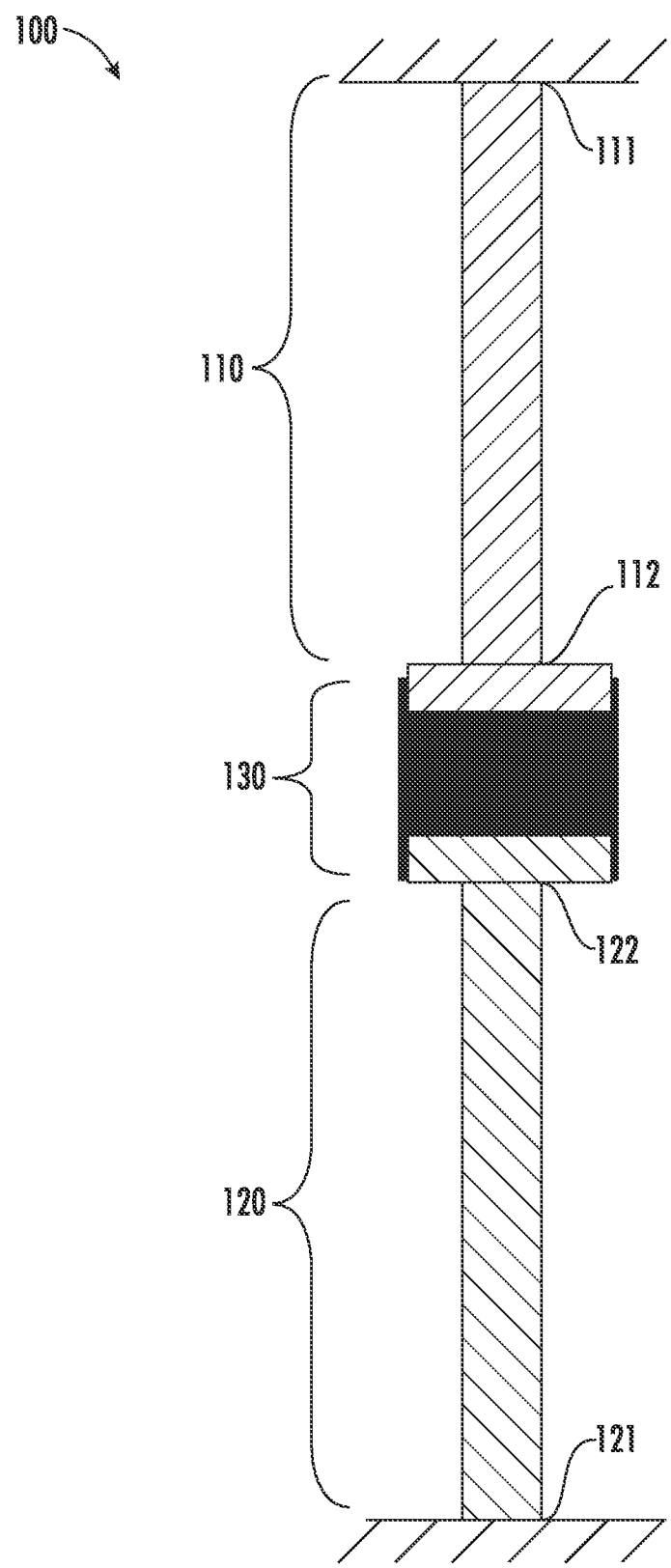
FIG. 1 is a perspective view of thermally driven elastocaloric system with a first SMA member, a second SMA member, and a connection mechanism in accordance with one aspect of the disclosure.

With reference now to the Figures, an exemplary thermally driven elastocaloric system 100 is shown in FIG. 1. The thermally driven elastocaloric system 100 includes a first SMA member 110, a second SMA member 120, and a connection mechanism 130. The first SMA member 110 has a proximal end 111 and a distal end 112. The second SMA member 120 has a proximal end 121 and a distal end 122. The connection mechanism 130 is configured between the distal end 112 of the first SMA member 110 and the distal end 122 of the second SMA member 120. The connection mechanism 130 is configured to transfer a force 300, 600 between the first SMA member 110 and the second SMA member 120.

It should be appreciated each respective SMA member 110, 120 may be made of a plurality of elements or a singular element (e.g., one or more wire(s), sheet(s), rod(s) and/or ribbon(s)). Each element may be composed of at least shape memory alloy. Each element may be arranged in any manner (e.g., parallel to one another to form a core, where each element supports the adjacent element(s)) that allows the SMA member 110, 120 to transfer heat and/or change in shape (e.g., length). Each respective SMA member 110, 120 may include one or more clamps or other mechanisms to prevent, or at least, mitigate the elements from separating from one another. In certain instances, the element(s) making up the first SMA member 110 may be composed of different shape memory alloy than the element(s) making up the second SMA member 120. However, it is envisioned that the element(s) making up the first SMA member 110 may be composed of the same shape memory alloy as the element(s) making up the second SMA member 120. It is envisioned that each respective SMA member may have specific shapes or mechanisms to enhance heat transfer proprieties (e.g., fins or internal channels to facilitate fluid circulation).

At least a portion of the first SMA member 110 and/or the second SMA member 120 may be made of nickel-titanium (NiTi, also known as "Nitinol"). In certain instances, at least one SMA member 110, 120 incorporates at least one shape memory alloy that is iron-based or copper-based, such as Fe—Mn—Si, Cu—Zn—Al, or Cu—Al—Ni. However, in certain instances, at least one SMA member 110, 120 incorporates at least one of the following shape memory alloys: Ag—Cd, Au—Cd, Co—Ni—Al, Co—Ni—Ga, Cu—Al—Be—X, Cu—Al—Ni, Cu—Al—Ni—Hf, Cu—Sn, Fe—Pt, Mn—Cu, Ni—Fe—Ga, Ni—Ti—Hf, Ni—Ti—Pd, Ni—Mn—Ga, or Ti—Nb. Each of the different potential shape memory alloys may have different properties (e.g., different temperatures at which their shape changes and/or generate different thermal potentials when force is applied). As such, in certain instances, the composition of each SMA member 110, 120 may be selected based on (i) the way in which the SMA member 110, 120 is configured with respect to the connection mechanism 130; (ii) the composition of the other SMA member 110, 120, and/or (iii) the particular way in which the SMA member 110, 120 will be used (e.g., to generate a thermal potential, or to change length).

It is envisioned that the connection mechanism 130 may be any suitable structure capable of transferring a force (e.g., a compressive force or tensile force) from one SMA member (e.g., from the first SMA member 110) to another SMA member (e.g., to the second SMA member 120). The main function of the connection mechanism is to transfer force while limiting or eliminating heat transfer by conduction (e.g., the connection mechanism may be made of material that provides heat insulation and has a high mechanical rigidity). For example, the connection mechanism 130 may be in the form of a piston or driveshaft. The distal end 112 of the first SMA member 110 and the distal end 122 of the second SMA member 120 each may respectively be clamped or otherwise fixed to the connection mechanism 130. However, it should be appreciated that the distal end 112, 122 of each SMA member 110, 120 may, in certain instances, not be fixed to the connection mechanism 130 (e.g., closely spaced, but not affixed). The proximal end 111 of the first SMA member and/or the proximal end 121 of the second SMA member 120 each may respectively be fixed to or closely spaced from a rigid structure (e.g., a housing). It should be appreciated that either end 111, 112 of the first SMA member 110 and either end 121, 122 of the second SMA member may be configured in any way that allows a force 300, 600 to be transferred through a connection mechanism 130.

Figure 2:
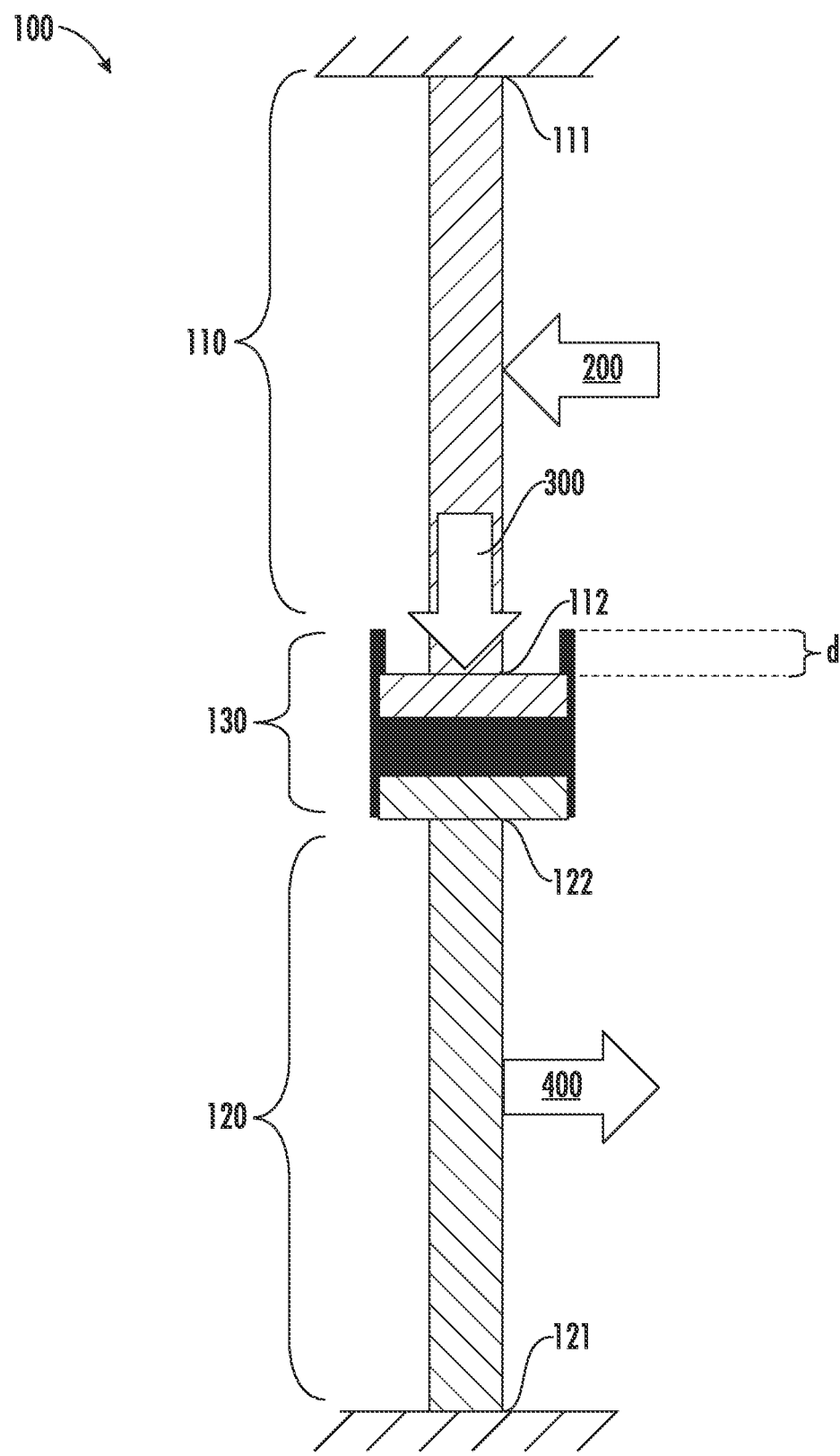
FIG. 2 is a perspective view of a thermally driven elastocaloric system, as shown in FIG. 1, with heat being transferred to the first SMA member in accordance with one aspect of the disclosure.

An exemplary embodiment of a thermally driven elastocaloric system 100 with heat 200 being transferred to the first SMA member 110 and a force 300 being transferred to the second SMA member 120 is shown in FIG. 2. To transfer heat 200 to the first SMA member 110 a working fluid (e.g., air, water, glycol, refrigerant, etc.) having a higher temperature than the first SMA member 110 may be passed over the first SMA member 110. When heat 200 is transferred to the first SMA member 110, the first SMA member 110 changes shape (e.g., length). This change may be viewed in terms of a deflection (d), as illustrated in FIG. 2. A typical deflection for a shape memory alloy may be around 4%. For example, if the first SMA member 110 is 1 meter in length, the first SMA member 110 may be expected to "grow" by approximately 4 cm when heat 200 is transferred to the first SMA member 110. This change is length is translated through the connection mechanism 130 generating a compressive force 300 on the second SMA member 120. This compressive force 300 generates a heating potential 400 in the second SMA member 120 (e.g., as an exothermic reaction). This heating potential 400 allows the second SMA member 120 to be able to release heat (e.g., to a working fluid, such as a refrigerant or air).

Figure 3:
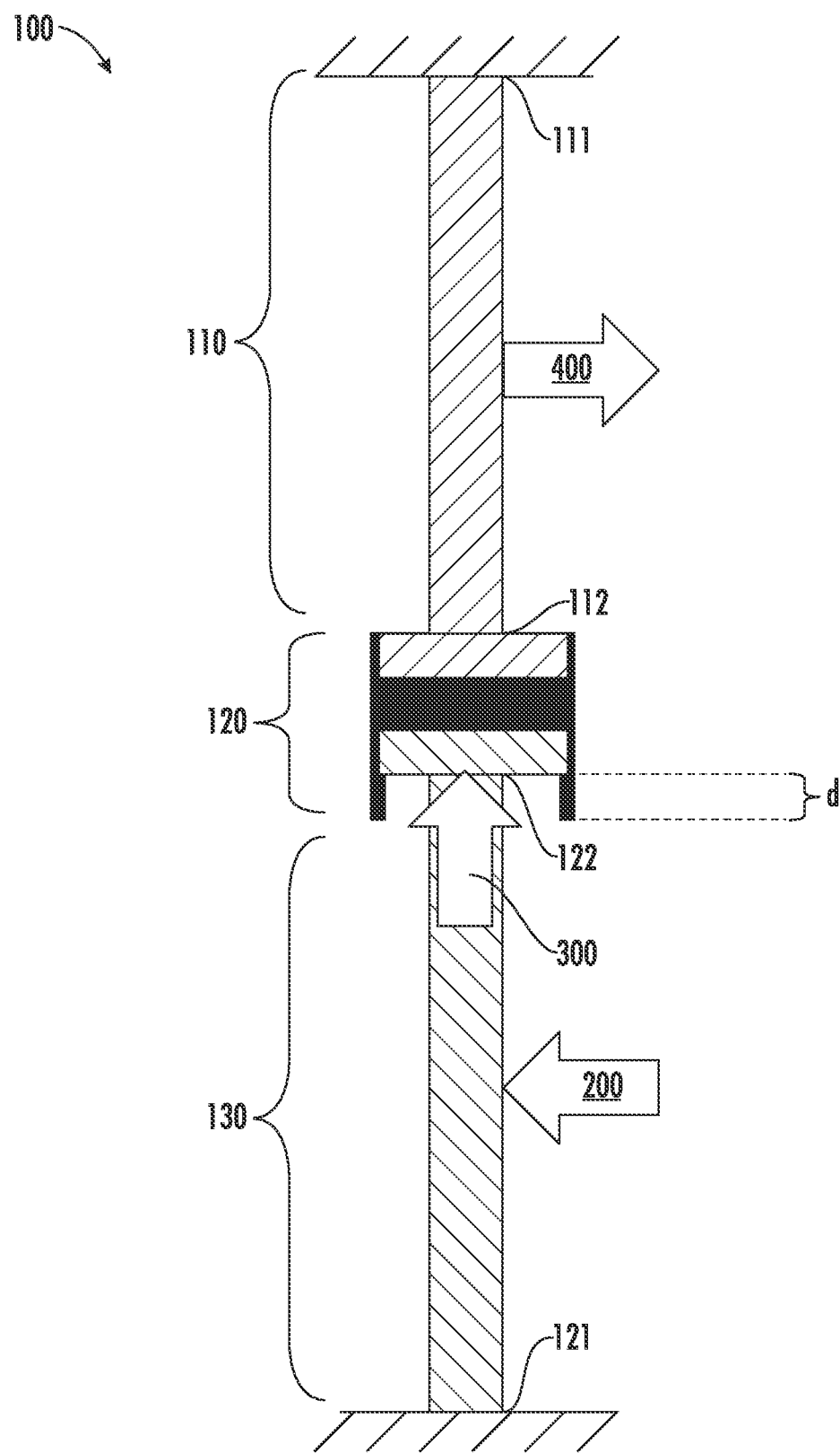
FIG. 3 is a perspective view of a thermally driven elastocaloric system, as shown in FIG. 1, with heat being transferred to the second SMA member in accordance with one aspect of the disclosure.

This process may be similarly completed by transferring heat 200 to the second SMA member 120. An exemplary embodiment of a thermally driven elastocaloric system 100 with heat 200 being transferred to the second SMA member 120 and a force 300 being transferred to the first SMA member 110 is shown in FIG. 3. To transfer heat 200 to the second SMA member 120 a working fluid (e.g., air, water, glycol, refrigerant, etc.) having a higher temperature than the second SMA member 120 may be passed over the second SMA member 120. When heat 200 is transferred to the second SMA member 120, the second SMA member 120 changes shape (e.g., length). This change may be viewed in terms of a deflection (d), as illustrated in FIG. 3. As mentioned above, this deflection may be around 4%. For example, if the second SMA member 120 is 1 meter in length, the second SMA member 120 may be expected to "grow" by approximately 4 cm when heat 200 is transferred to the second SMA member 120. This change in length is translated through the connection mechanism 130 generating a compressive force 300 on the first SMA member 110. This compressive force 300 generates a heating potential 400 in the first SMA member 110 (e.g., as an exothermic reaction). This heating potential 400 allows the first SMA member 110 to be able to release heat (e.g., to a working fluid, such as a refrigerant or air).

Figure 4:
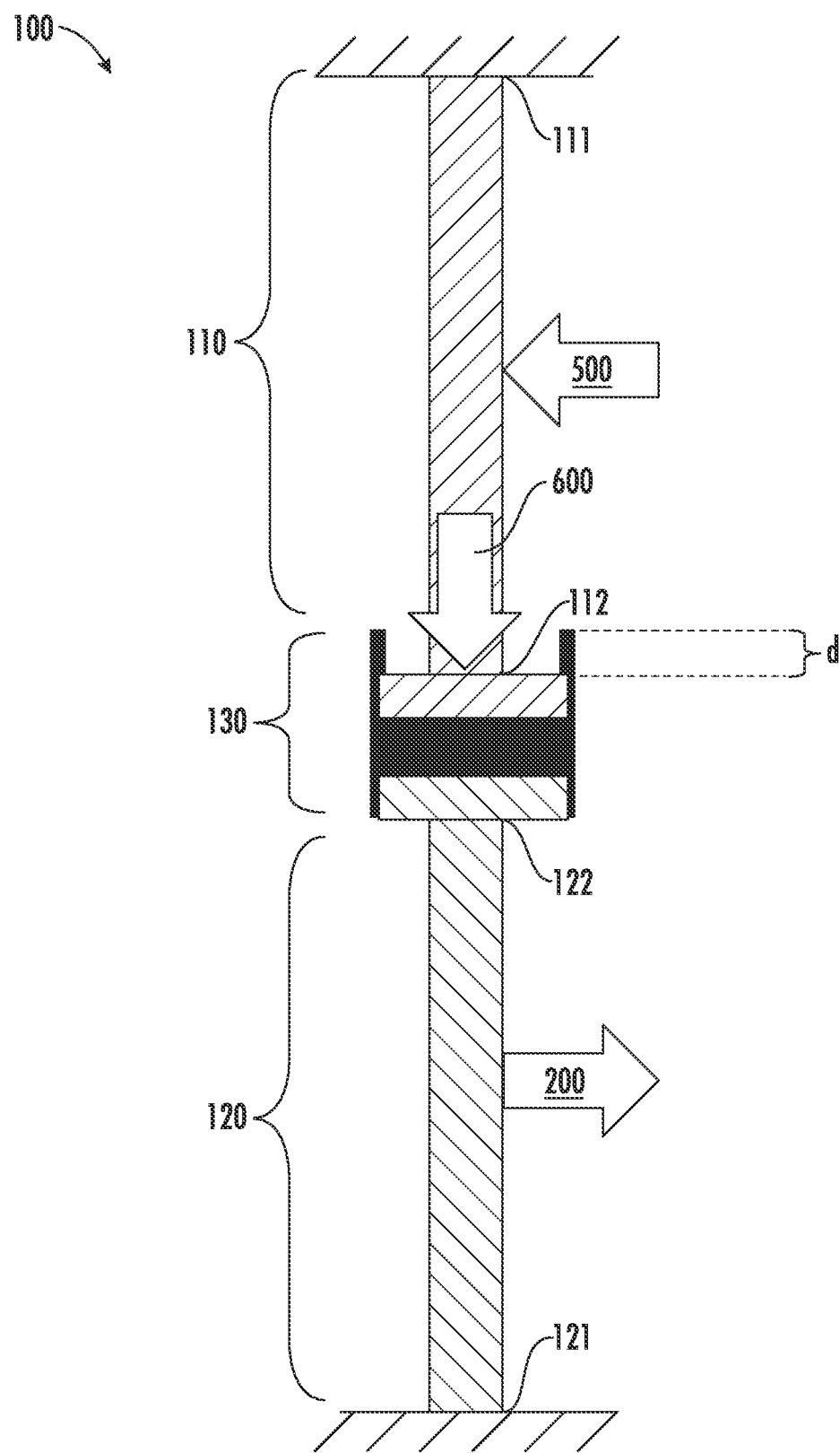
FIG. 4 is a perspective view of a thermally driven elastocaloric system, as shown in FIG. 1, with heat being transferred from the second SMA member in accordance with one aspect of the disclosure.

Similarly, heat 200 may be transferred from second SMA member 120. An exemplary embodiment of a thermally driven elastocaloric system 100 with heat 200 being transferred from the second SMA member 120 and a force 600 being transferred to the first SMA member 110 is shown in FIG. 4. To transfer heat 200 from the second SMA member 120 a working fluid (e.g., air, water, glycol, refrigerant, etc.) having a lower temperature than the second SMA member 120 may be passed over the second SMA member 120. When heat 200 is transferred from the second SMA member 120, the second SMA member 120 changes shape (e.g., length). This change may be viewed in terms of a deflection (d), as illustrated in FIG. 4. As mentioned above, this deflection may be around 4%. For example, if the second SMA member 120 is 1 meter in length, the second SMA member 120 may be expected to "shrink" by approximately 4 cm when heat 200 is transferred from the second SMA member 120. This change is length is translated through the connection mechanism 130 generating a tensile force 600 on the first SMA member 110. This tensile force 300 generates a cooling potential 500 in the first SMA member 110 (e.g., as an endothermic reaction). This cooling potential 500 allows the first SMA member 110 to be able to absorb heat (e.g., from a working fluid, such as a refrigerant or air).

Figure 5:
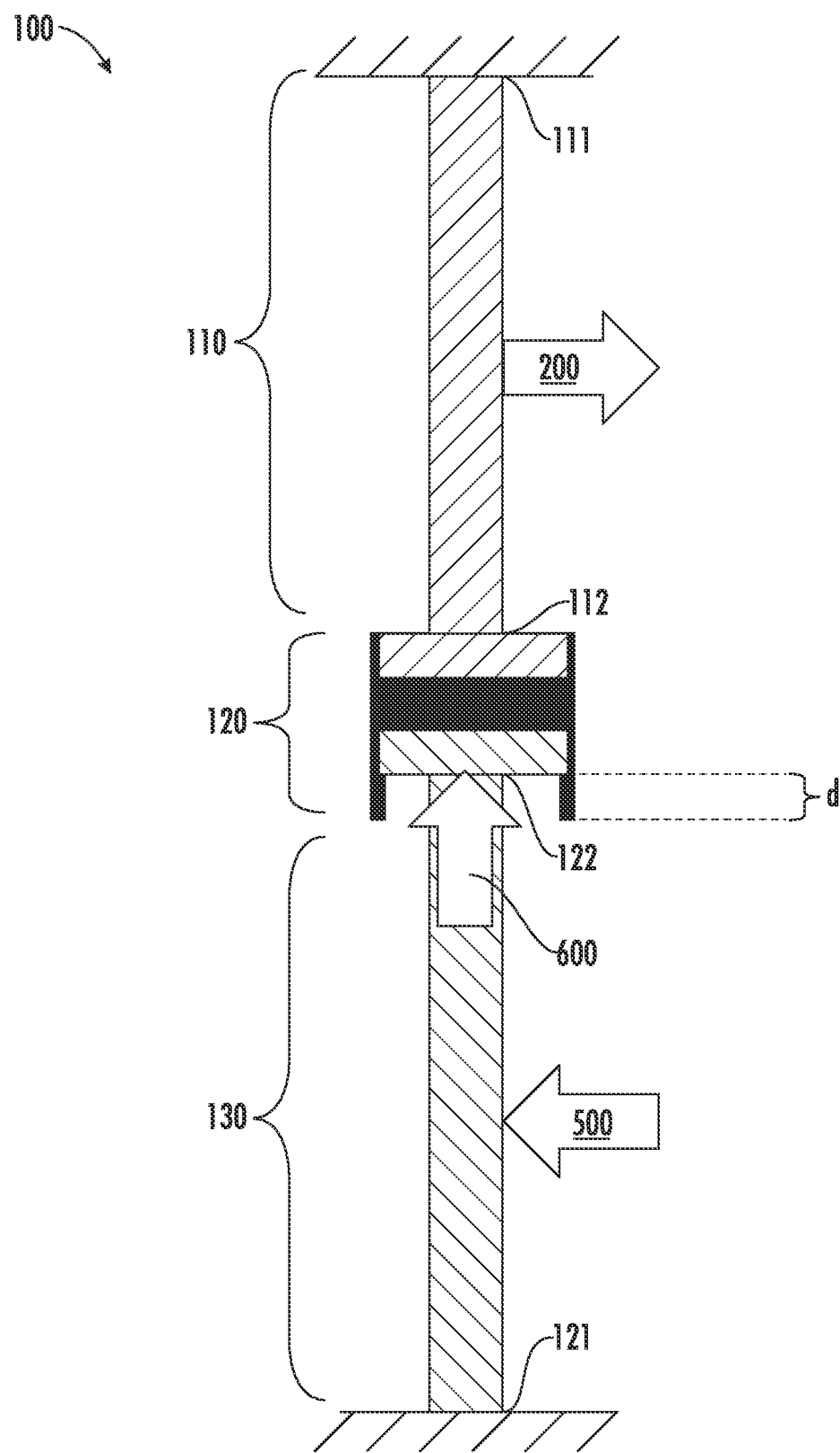
FIG. 5 is a perspective view of a thermally driven elastocaloric system, as shown in FIG. 1, with heat being transferred from the first SMA member in accordance with one aspect of the disclosure.

This process may be similarly completed by transferring heat 200 from the first SMA member 110. An exemplary embodiment of a thermally driven elastocaloric system 100 with heat 200 being transferred from the first SMA member 110 and a force 600 being transferred to the second SMA member 120 is shown in FIG. 5. To transfer heat 200 from the first SMA member 110 a working fluid (e.g., air, water, glycol, refrigerant, etc.) having a lower temperature than the first SMA member 110 may be passed over the first SMA member 110. When heat 200 is transferred from the first SMA member 110, the first SMA member 110 changes shape (e.g., length). This change may be viewed in terms of a deflection (d), as illustrated in FIG. 5. As mentioned above, this deflection may be around 4%. For example, if the first SMA member 110 is 1 meter in length, the first SMA member 110 may be expected to "shrink" by approximately 4 cm when heat 200 is transferred from the first SMA member 110. This change in length is translated through the connection mechanism 130 generating a tensile force 600 on the second SMA member 120. This tensile force 300 generates a cooling potential 500 in the second SMA member 120 (e.g., as an endothermic reaction). This cooling potential 500 allows the second SMA member 120 to be able to absorb heat (e.g., from a working fluid, such as a refrigerant or air).

The configuration of the thermally driven elastocaloric system 100 makes is possible to generate a thermal potential (e.g., a heating potential or a cooling potential) without reliance on electrical power or combustible fuel. As mentioned above, this method of producing a thermal potential may be particularly useful in any application, which has a waste heat source and/or relies on thermodynamic principles (e.g., heating, ventilation and/or air conditioning (HVAC) systems). This method of generating at least one of a heating potential and a cooling potential is shown in FIG. 6.

This method 800 may be completed, for example, using the exemplary thermally driven elastocaloric system 100 shown in FIGS. 1-5. As described above, the method 800 may provide for the transferring of heat between (e.g., to or from) a working fluid and at least one of a first SMA member 110 and a second SMA member 120, as illustrated by step 810 in FIG. 6. A connection mechanism 130 may be configured between the first SMA member 110 and the second SMA member 120. The method 800 provides for the transferring of a force (e.g., a compressive force 300 or a tensile force 600) between the connection mechanism 130 and at least one of the first SMA member 110 and the second SMA member 120. The transfer of a compressive force 300 may generate a heating potential 400. The transfer of a tensile force 600 may generate a cooling potential 500.

FIG. 6 is provided to illustrate the generation of thermal potentials 400, 500 based on where heat 200 is transferred. Step 820 illustrates the transfer of heat 200 either to or from the first SMA member 110 (e.g., by a working fluid). If transferred from the first SMA member 110 a cooling potential 500 is generated in the second SMA member 120 (shown by step 821). If transferred to the first SMA member 110 a heating potential 400 is generated in the second SMA member 120 (shown by step 822). Step 830 illustrates the transfer of heat 200 either to or from the second SMA member 120 (e.g., by a working fluid). If transferred to the second SMA member 120 a heating potential 400 is generated in the first SMA member 110. If transferred from the second SMA member 120 a cooling potential 500 is generated in the first SMA member 110.

The use of the terms "a" and "and" and "the" and similar referents, in the context of describing the invention, are to be construed to cover both the singular and the plural, unless otherwise indicated herein or cleared contradicted by context. The use of any and all example, or exemplary language (e.g., "such as", "e.g.", "for example", etc.) provided herein is intended merely to better illuminate the invention and does not pose a limitation on the scope of the invention unless otherwise claimed. No language in the specification should be construed as indicating any non-claimed elements as essential to the practice of the invention.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A thermally driven elastocaloric system comprising:
a first shape memory alloy (SMA) member comprising a proximal end and a distal end;
a second shape memory allow (SMA) member comprising a proximal end and a distal end; and
a connection mechanism configured between the distal end of the first SMA member and the distal end of the second SMA member, the connection mechanism configured to transfer a force between the first SMA member and the second SMA member, wherein the distal end of the first shape memory alloy, the distal end of the second shape memory alloy and the connection mechanism are disposed in a housing.

2. The thermally driven elastocaloric system of claim 1, further comprising a working fluid for transferring a heat between the working fluid and at least one of the first SMA member and the second SMA member.

3. The thermally driven elastocaloric system of claim 2, wherein the working fluid is configured to transfer heat to the first SMA member.

4. The thermally driven elastocaloric system of claim 3, wherein the connection mechanism transfers a compressive force to the second SMA member when heat is transferred from the working fluid to the first SMA member.

5. The thermally driven elastocaloric system of claim 4, wherein the compressive force transferred by the connection mechanism to the second SMA member generates a heating potential in the second SMA member.

6. The thermally driven elastocaloric system of claim 2, wherein the working fluid is configured to transfer heat to the second SMA member.

7. The thermally driven elastocaloric system of claim 6, wherein the connection mechanism transfers a compressive force to the first SMA member when heat is transferred from the working fluid to the second SMA member.

8. The thermally driven elastocaloric system of claim 7, wherein the compressive force transferred by the connection mechanism to the first SMA member generates a heating potential in the first SMA member.

9. The thermally driven elastocaloric system of claim 2, wherein the working fluid is configured to transfer heat from the first SMA member.

10. The thermally driven elastocaloric system of claim 9, wherein the connection mechanism transfers a tensile force to the second SMA member when heat is transferred from the first SMA member to the working fluid.

11. The thermally driven elastocaloric system of claim 10, wherein the tensile force transferred by the connection mechanism to the second SMA member generates a cooling potential in the second SMA member.

12. The thermally driven elastocaloric system of claim 2, wherein the working fluid is configured to transfer heat from the second SMA member.

13. The thermally driven elastocaloric system of claim 12, wherein the connection mechanism transfers a tensile force to the first SMA member when heat is transferred from the second SMA member to the working fluid.

14. The thermally driven elastocaloric system of claim 7, wherein the tensile force transferred by the connection mechanism to the first SMA member generates a cooling potential in the first SMA member.

15. A method for generating at least one of a heating potential and a cooling potential, the method comprising:
transferring a heat between a working fluid and at least one of a first SMA member having a proximal end and a distal end and a second SMA member having a proximal end and a distal end, a connection mechanism configured between the distal end of the first SMA member and the distal end of the second SMA member, wherein the distal end of the first SMA member, the distal end of the second SMA member and the connection mechanism are disposed in a housing; and
transferring a force between the connection mechanism and at least one of the first SMA member and the second SMA member, the force comprising at least one of: a compressive force and a tensile force.

16. The method of claim 15, wherein the transfer of the compressive force generates a heating potential and the transfer of a tensile force generates a cooling potential.

17. The method of claim 15, wherein the transfer of heat from the working fluid to the first SMA member generates the transfer of a compressive force from the connection mechanism to the second SMA member.

18. The method of claim 17, wherein the compressive force transferred by the connection mechanism to the second SMA member generates a heating potential in the second SMA member.

19. The method of claim 15, wherein the transfer of heat from the first SMA member to the working fluid generates the transfer of tensile force from the connection mechanism to the second SMA member.

20. The method of claim 19, wherein the tensile force transferred by the connection mechanism to the second SMA member generates a cooling potential in the second SMA member.

* * * * *